July 25, 1939.　　　　K. C. MONROE　　　　2,167,281
PRESSURE SUSTAINING VALVE
Filed March 21, 1938　　　　2 Sheets-Sheet 1

Inventor
Kenneth C. Monroe
By attorney
Chas. T. Hawley

July 25, 1939.  K. C. MONROE  2,167,281
PRESSURE SUSTAINING VALVE
Filed March 21, 1938   2 Sheets—Sheet 2
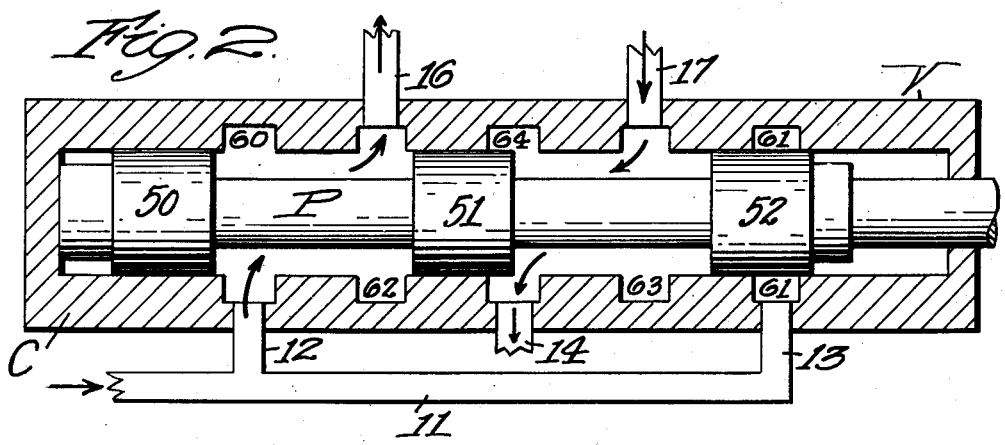
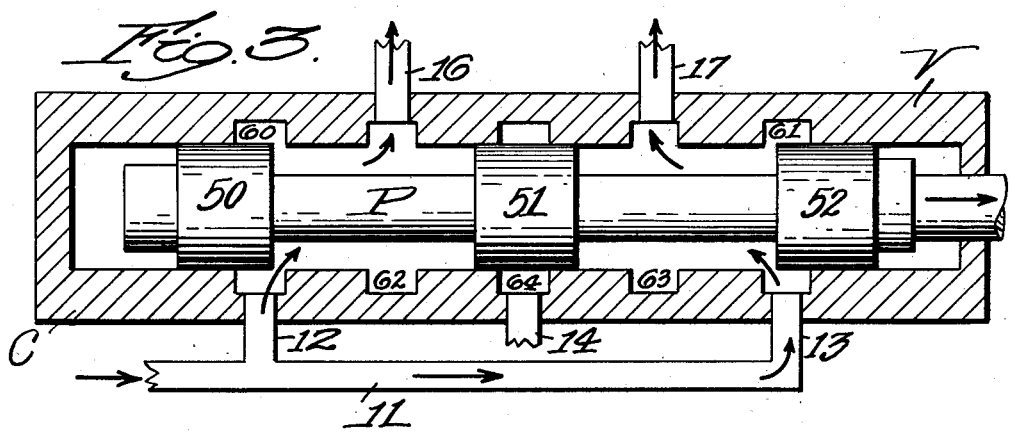
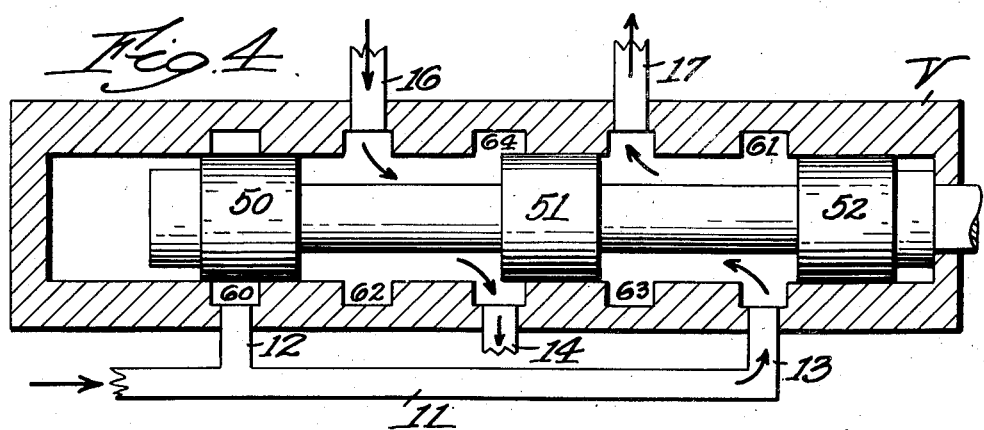
Inventor
Kenneth C. Monroe Patented July 25, 1939

2,167,281

UNITED STATES PATENT OFFICE 2,167,281

PRESSURE-SUSTAINING VALVE

Kenneth C. Monroe, Hudson, Mass., assignor to The Lapointe Machine Tool Company, Hudson, Mass., a corporation of Maine Application March 21, 1938, Serial No. 197,082

1 Claim. (Cl. 251—76)

This invention relates to a valve particularly designed for use under conditions such that it is desirable to maintain pressure in certain connections as the valve shifts, until pressure in certain other connections has been built up. Such a valve may be useful, for instance, in a combination in which a work-clamping cylinder is connected to both ends of a work-shifting cylinder, the valve being effective to maintain continuous work-clamping pressure regardless of reversals of pressure in the two ends of the work-shifting cylinder.

It is the general object of my invention to provide a simple and reliable valve by which pressures may be maintained as the valve is shifted under such conditions as are above set forth.

My invention further relates to arrangements and combinations of parts which will be hereinafter described and more particularly pointed out in the appended claim.

A preferred form of the invention is shown in the drawings, in which

Fig. 2 is a sectional plan view of the valve; and

Figs. 3 and 4 are views similar to Fig. 2 but showing successive operative positions of the valve.

Figure 1:
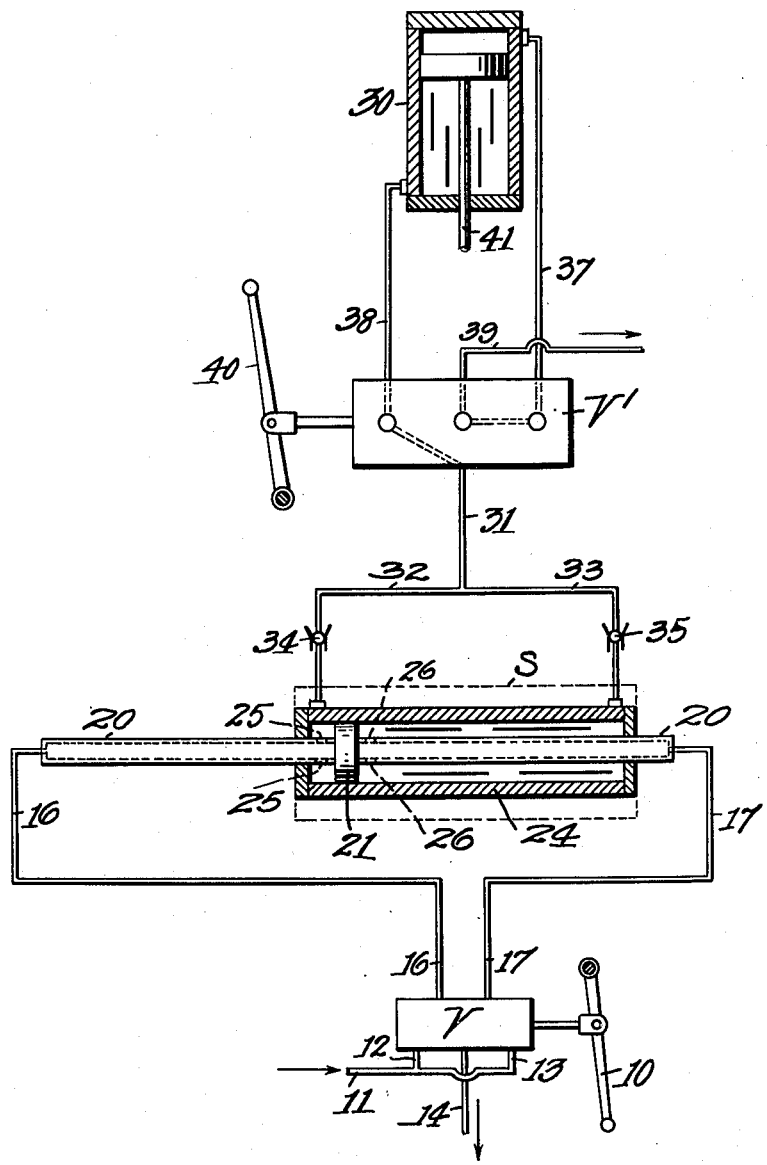
Fig. 1 is a diagrammatic view of a combination in which my improved valve may desirably be used.

Referring to Fig. 1, I have shown my improved valve V as provided with a handle 10 by which it may be manually shifted, and as also provided with a supply pipe 11 having branches 12 and 13 and with an exhaust pipe 14.

The valve V is connected by pipes 16 and 17 to the opposite ends of a fixed tubular piston rod 20 having a piston 21 fixed at its middle point. A cylinder 24 is mounted to slide on the fixed piston rod 20 and piston 21. Ports 25 and 26 connect the separated tubular end portions of the piston rod 20 to the interior of the cylinder 24 at opposite sides of the piston 21.

A work-supporting fixture slide S is mounted on the cylinder 24, as is also a valve V' and a work-clamping cylinder 30. A supply pipe 31 for the valve V' is connected by branch pipes 32 and 33 to the opposite ends of the cylinder 24, and the branch pipes 32 and 33 are provided with check valves 34 and 35 opening toward the valve V'.

Pipes 37 and 38 connect the valve V' to the upper and lower ends of the cylinder 30 and a pipe 39 connects the valve V' to the exhaust. The valve V' may be operated manually by a handle 40.

When pressure is supplied to the pipe 37, the work is clamped by devices not shown but actuated from the piston rod 41. When pressure is applied through the pipe 38, the work-clamping devices are released.

If such a work-supporting and work-clamping combination is used in a machine having two operating positions to which the work is presented by shifting the cylinder 24 and fixture slide S, it is desirable to maintain pressure in the pipe 31, valve V' and pipe 38 during the shifting of the cylinder and fixture slide, so that the work may not be even momentarily released. In order to thus maintain pressure in the pipe 31, I have provided the special valve V shown in detail in Figs. 2, 3 and 4.

The valve V comprises a casing C having a piston P slidable therein and provided with spaced piston elements 50, 51 and 52. The casing C is provided with pressure supply ports 60 and 61 connected to the branch supply pipes 12 and 13, operating ports 62 and 63 connected to the pipes 16 and 17, and an exhaust port 64 connected to the exhaust pipe 14.

With the piston P at its left-hand limit of travel as shown in Fig. 2, the supply pipe 12 is connected through the ports 60 and 62 to the pipe 16, and the pipe 17 is connected through the ports 63 and 64 to the exhaust pipe 14. Pressure is thus maintained in the left-hand end of the cylinder 24 through the ports 25 in the piston rod 20, while the right-hand end of the cylinder is connected through the pipe 17 to the exhaust as described. The cylinder and associated parts will move to the left.

Pressure is thus supplied through the check valve 34, pipes 32 and 31, valve V' and pipe 38 to the lower end of the cylinder 30, thus clamping the work. The by-pass connection through the pipe 33 to the exhaust is blocked off by the check valve 35.

If the piston rod P in the valve V is now moved to its opposite or right-hand limit of travel, the following conditions will prevail. As the piston P reaches the mid-position shown in Fig. 3, it will be seen that the exhaust port 64 is entirely closed by the piston part 51, the pressure port 60 is still partially open and connected to the port 62, and the pressure port 61 is also partially open and connected to the port 63. Pressure is thus still maintained in the pipe 16 and is being supplied through the pipe 17. Consequently both ends of the cylinder 24 are under pressure and pressure for the valve V' and for the work-clamping cylinder 30 is being supplied through both branch pipes 32 and 33.

As the piston P continues its movement to the right to the position shown in Fig. 4, the pressure port 60 is closed by the piston part 50, the pipe 16 is connected to the exhaust pipe 14 through the ports 62 and 64, and the branch pressure pipe 13 maintains its connection through the ports 61 and 63 to the pipe 17.

The pressures in the cylinder 24 are now reversed and the cylinder will shift to the right to its alternative working position, but during the reversal of pressures by which this movement is effected, pressure has been at all times maintained in the pipe 31, valve V' and pipe 38 and the work has remained continuously clamped.

This is a substantial advantage over the usual four-way valve in which pressure in one supply connection is invariably cut off before pressure in the opposite supply connection is admitted.

In mechanism operated hydraulically and with a substantially non-compressible liquid, such shutting off the pressure in the pipe 32, for instance, before applying pressure in the pipe 33 would release the clamping pressure on the work, if there was the slightest leakage in the check valves 34 or 35 or in the valve V' or past the piston in the cylinder 30. With my improved valve, however, a direct pressure connection is maintained at all times during the shifting of the piston P and particularly as the piston passes its mid position.

Under certain conditions of operation, it may be desirable to provide very heavy clamping pressure but to prevent too rapid movement of the cylinder 24, with resultant drop of pressure in the pressure end thereof. For this purpose, a substantial back pressure may be provided on the exhaust pipe 14, so that the cylinder 24 will be operated by the differential pressure only, while the full pressure will be available in the work-clamping cylinder 30.

Having thus described my invention and the advantages thereof, I do not wish to be limited to the details herein disclosed, otherwise than as set forth in the claim, but what I claim is:

A valve comprising a cylindrical casing having two operating ports, two pressure supply ports and an exhaust port, an axially movable valve member having three piston elements in definite spaced relation, and means to move said valve member, said ports and piston elements being so spaced axially of said valve member that a first operating port remains connected to its pressure supply port as said valve member is moved axially until after the second operating port has been connected to the second pressure supply port, and said first operating port being thereafter connected to the exhaust port by further axial movement of said valve member in the same direction.

KENNETH C. MONROE.